Sept. 19, 1933.   H. G. MUELLER   1,927,524
STEAM ENGINE INLET VALVE GEAR
Filed Dec. 7, 1927   6 Sheets-Sheet 1

FIG 4

Sept. 19, 1933.  H. G. MUELLER  1,927,524
STEAM ENGINE INLET VALVE GEAR
Filed Dec. 7, 1927  6 Sheets-Sheet 5

INVENTOR.
Herman G. Mueller
BY
ATTORNEYS.

Patented Sept. 19, 1933

1,927,524

UNITED STATES PATENT OFFICE 1,927,524

STEAM ENGINE INLET VALVE GEAR

Herman G. Mueller, Erie, Pa., assignor to Skinner Engine Company, Erie, Pa., a corporation of Pennsylvania Application December 7, 1927. Serial No. 238,435

14 Claims. (Cl. 121—125)

The present valve gear is particularly advantageous with relation to poppet valves. It involves the utilization of two cams, the action on the valve being a resultant of the combined cam action of the cams. In this way great flexibility of control is possible and the opening movement of the valve may be controlled by one of the cams so that its timing may be made as most desirable and the closing motion of the valve may be controlled by the other cam so that the variation of the closing does not in any way vary the opening. The invention is particularly advantageous where a speed sensitive device is utilized as a means of controlling the speed in that it may be made to vary the closing cam, which cam being relieved of the load incident to opening the valve, requires but little power to actuate it so that the governing device for a comparatively large engine may be quite small. The method of operating the valve also is particularly advantageous in that it permits of the cam mechanism being placed directly between two valves, each operating one end of a double-acting engine. Thus the mechanism may be very much simplified, particularly if the cams are so formed that the same cams actuate both valves. The mechanism is peculiarly applicable to engines having a plurality of cylinders in that the valve gear may be arranged across the cylinders with a single actuating and controlling mechanism. This is particularly true when the cams are fixed on the shafts in that the control may be accomplished through the shafts themselves. Further features and details will be illustrated and described in the specification and claims.

A preferred embodiment of the invention is illustrated in the accompanying drawings as follows:—

Figures 1, 2:
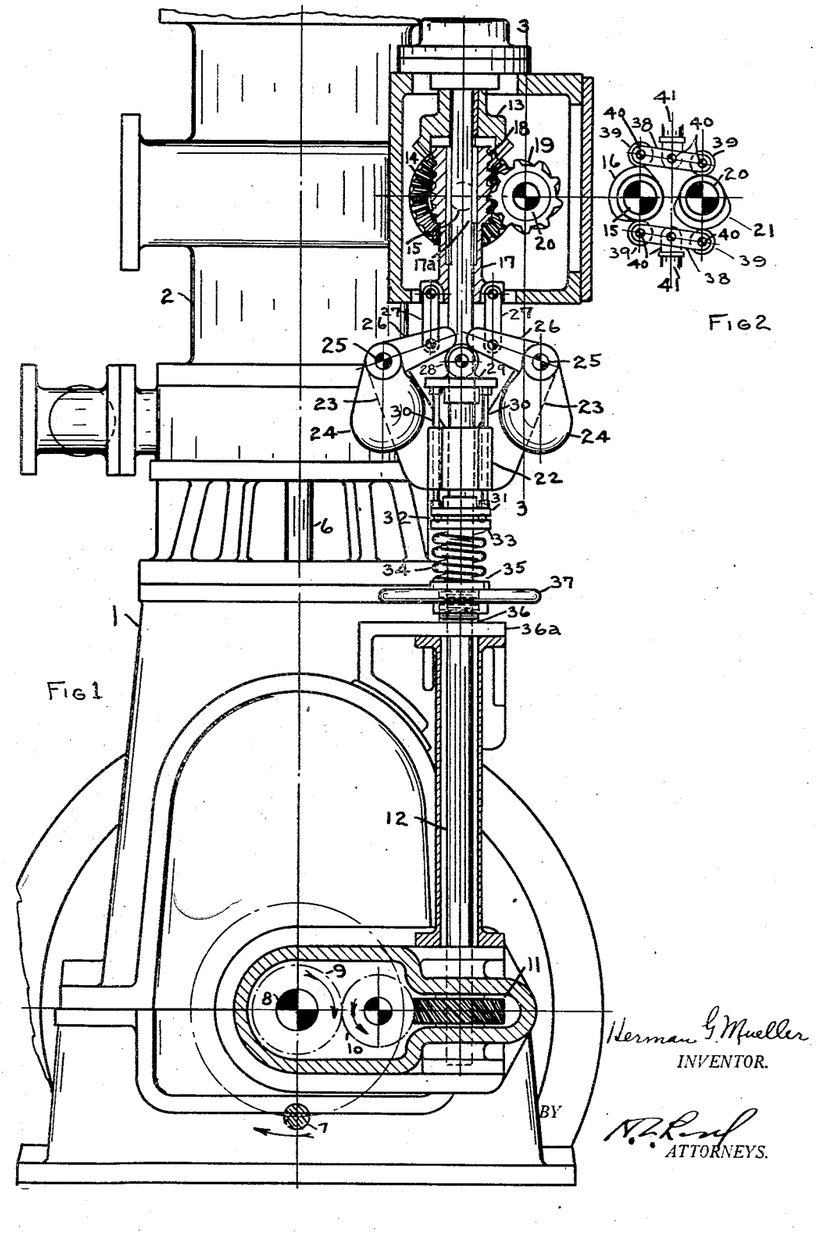
Fig. 1 shows a side elevation of the engine, parts being in section on the line 1—1 in Fig. 3.
Fig. 2 an elevation of the cam mechanism.
Figure 3:
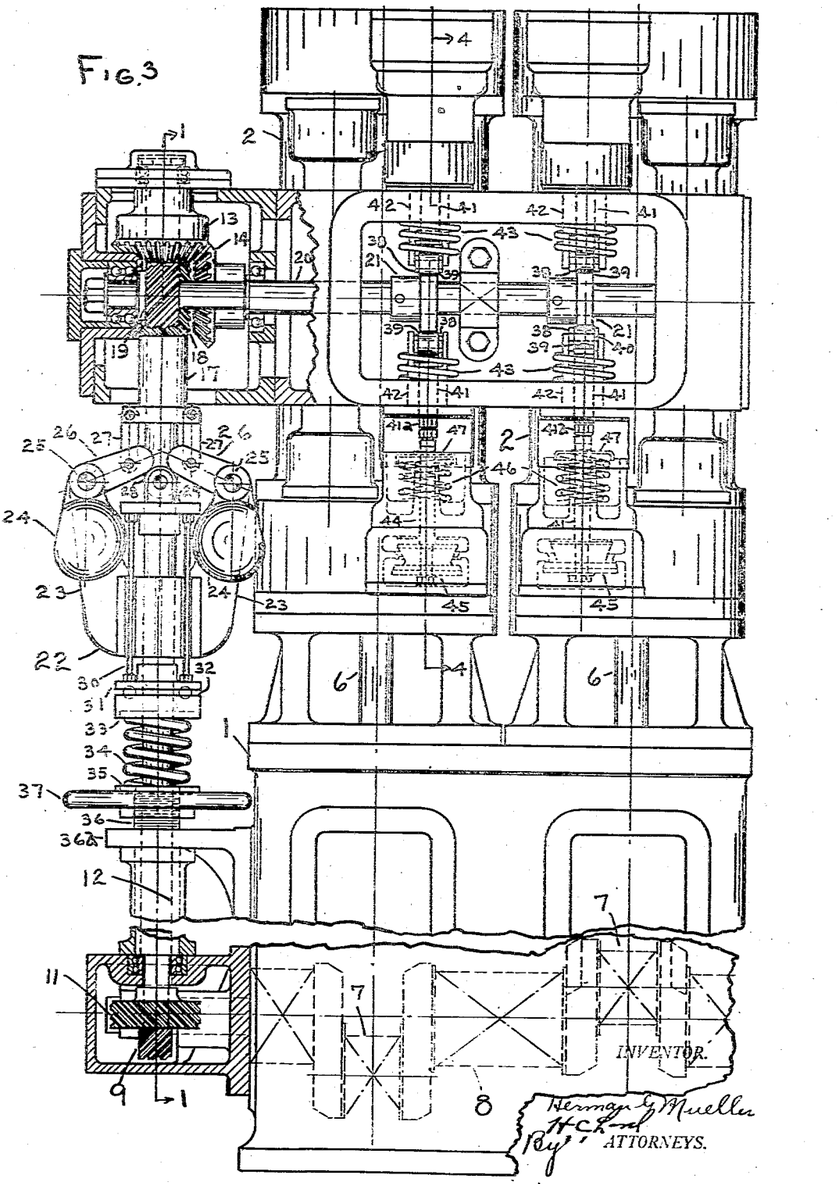
Fig. 3 a front elevation of the engine, a part being in section on the line 3—3 in Fig. 1.
Figure 4:
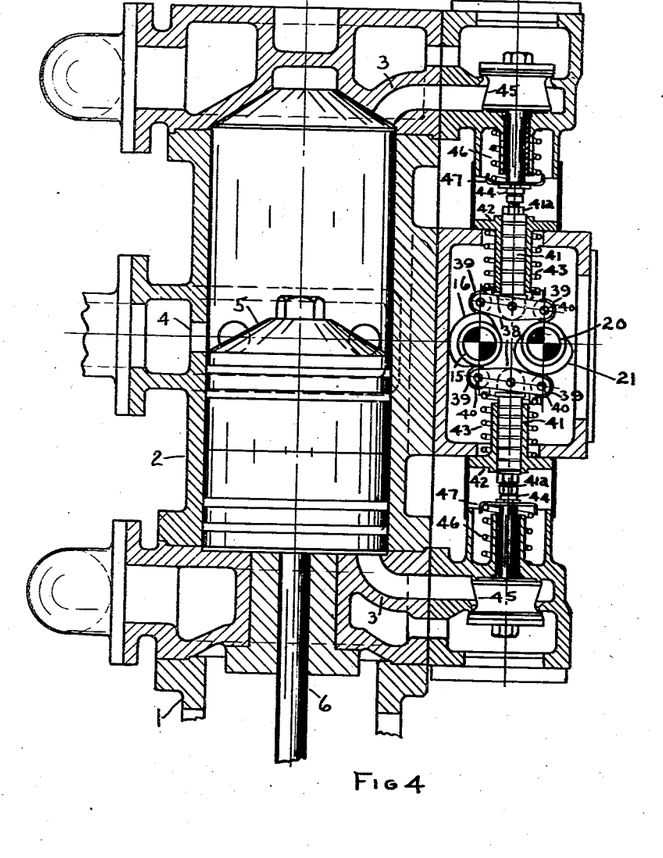
Fig. 4 a section through the cylinder and valves on the line 4—4 in Fig. 3.

1 marks the engine frame, 2 the engine cylinder, 3 inlet ports to the cylinder, 4 the central exhaust ports, and 5 the piston, the piston shown being an elongated piston and operating over the ports 4 in the manner of a uniflow engine. 6 marks the piston rod, and 7 a crank which is connected with the piston rod by the usual connecting rod (not shown) and 8 a crank shaft. Preferably there are a plurality of engine cylinders placed abreast as indicated in Fig. 3, said cylinders operating in connection with the crank shaft 8.

A gear 9 is mounted on the crank shaft. It drives an intermediate gear 10 which in turn operates upon a gear 11 arranged at the bottom of a cam driving shaft 12 mounted in suitable bearings in the frame. A gear 13 is fixed on the shaft 12 near its upper end and the gear 13 meshes with a gear 14. The gear 14 drives a cam shaft 15, said shaft having fixed upon it the opening cams 16.

A sleeve 17 is slidingly mounted on the shaft 12 and locked against rotation thereon by a spline 17a. A spiral gear 18 is formed on the sleeve 17 and meshes with a spiral gear 19. The spiral gear 19 is fixed on a cam shaft 20 carrying a closing cam 21.

The speed sensitive device, or governor, is mounted on the shaft 12. A carrier 22 is fixed on the shaft 12. It has the weight-carrying arms 23. Centrifugal weights 24 are pivoted by means of pins 25 on the arms 23. Arms 26 extend inwardly from the weights 24 and are connected by links 27 with the sleeve 17 so that with a movement of the weights 24 in response to centrifugal force this movement is carried to the sleeve 17 through the arms 26 and links 27. The inner end of the arms 26 engage a roller 28 mounted in a cross head 29 slidingly mounted on the shaft 12. Pins 30 extend through the carrier 22 to a head 31. The pins are free to move in the carrier 22. The head 31 operates through a ball bearing 32 against a spring base 33. A spring 34 is arranged around the shaft 12 and is seated upon an adjustable seat 35 carried by a screw 36 extending from a platform 36a on the frame. A hand wheel 37 is arranged on the seat 35 and operates this seat on the screw 36 so as to vary the adjustment of the spring 34 to vary the normal speed of the engine as controlled by the speed sensitive device.

Cam riders in the form of rockers 38 operate on the cams 16 and 21. These riders are provided with rollers 39 which operate on the cam surfaces and are pivotally mounted by pins 40 on a push rod 41, the push rod being slidingly mounted in a sleeve 42 mounted in the frame. The rockers are maintained continuously in contact with the cams by springs 43 surrounding the sleeve 42 and operating against the rockers 38 holding the rockers in engagement with the cam. The push rods 41 have connections 41a with valve stems 44 of steam valves 45. These steam valves are of any desired poppet type and the valves are held to their seats by springs 46 operating against heads 47 on the stems.

Figures 5, 11:
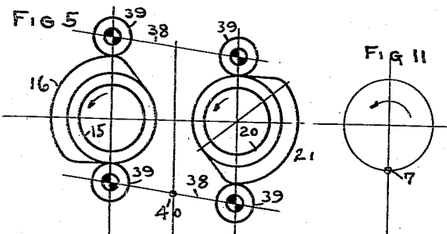
Figs. 5, 6 and 7 show the cam action at different positions of the crank with no valve opening.
Figs. 11, 12 and 13 show the positions of the crank with relation to the positions of the cams in Figs. 8, 9 and 10.
Figures 6, 12:
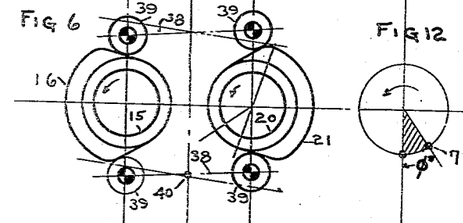
Figures 7, 13:
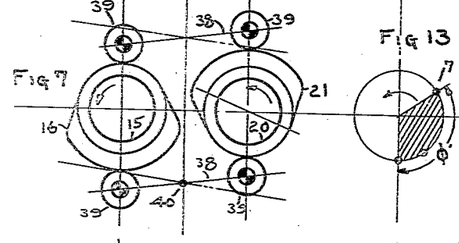

In Figs. 5 to 10 there is shown diagrammatically the action of the cams on the rockers and the resultant valve lift for each relative position of the cam. The cams are shown in Figs. 5, 6 and 7 with the cam 21 so swung relatively to the opening cam 16 as to result in a neutralization of the actions of the cams on the push rods. The position of the push rods is indicated by the position of the pivot pins 40. It will be noted that the high surface of one cam is so proportioned relatively to the low surface of the other cam that with the rocker on a high surface of one cam and a low surface of its companion cam leaves the point 41 at the neutral, or closed position of the valve and that the inclines of the cams are so fashioned that with the cams positioned as shown in Figs. 5, 6 and 7 the movement of one end of the rider as it passes up the slope of the cam corresponds to the downward movement of the opposite end of the rider and in consequence the movement of the cams simply results in the rocking of the riders without any resultant movement of the pins 40 and consequently without resultant movement of the valves. This is important, as it brings the valve gear at neutral to zero and holds the valve in closed position. The governor, therefore, acts as a safety device and is relieved of the work at neutral that would ensue from a movement of the tappets, the only load being the rocking of the rocker. It also permits of adjustments of all tappets by setting the cam shaft in neutral. With this adjustment all parts may be set with one setting of the engine as everything is at zero position.

Figure 8:
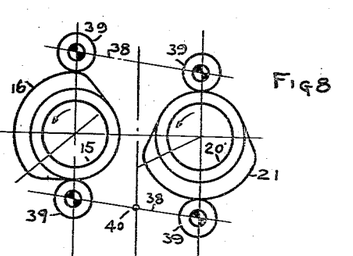
Figs. 8, 9 and 10 show the relative position of the cams with the closing cam retarded to affect a valve opening.
Figure 9:
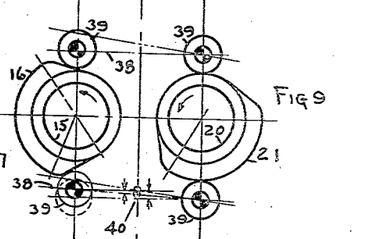
Figure 10:
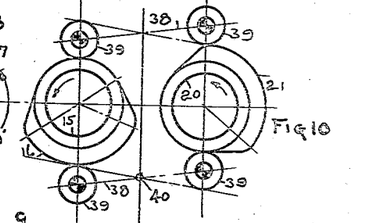

In Figs. 8, 9 and 10 it will be noted that the closing cam 21 has been retarded and as a result there is an opening of the valve as indicated particularly in Fig. 9. The valve positions in Figs. 8, 9 and 10 correspond to the crank positions illustrated in Figs. 11, 12 and 13. Thus in Fig. 11 the crank 7 is shown on center. In Fig. 12 the crank is shown slightly advanced and in Fig. 13 the crank is shown advanced to about three quarters of its stroke. In Fig. 8, it will be noted, that the cam rocker operating the lower valve is riding the high surface of the closing cam 21 and the opening cam operating on the rocker has just begun to lift the valve.

In the position shown in Fig. 9 the rocker has nearly reached the high surface of the opening cam 16 and the valve is approaching its wide open position with the rocker on the high surfaces of the cams.

In the position shown in Fig. 10 it will be noted that the rocker is still riding the opening cam but has reached the low surface of the closing cam so that at this position there is a complete cut-off of the valve, the point of cut-off with its setting of the eccentrics being indicated with the crank 7 at the farthest position of its throw.

The operation of the governing device in varying the position of the closing cam is as follows:—

With the spiral gear 18 in a fixed position it rotates with the gear 13 and causes a rotation of the shaft 20 carrying the closing cam in exact unison with the shaft 15 carrying the opening cams. When, however, the governor weights move inwardly, or outwardly, the spiral gear 18 is moved axially on the shaft 12 and this either retards, or advances, the gear 19 relatively to the gear 13 and consequently retards, or advances, the cam 21 relatively to the cam 16 and this variation in the position of the cam 21 varies the time of closing the valve and consequently controls, or regulates, the point of cut-off of the valve and the consequent power of the engine. It will be noted in this connection that this variation in the closing cam does not vary the action, or timing of the opening cam, so that with each point of cut-off the opening of the valve remains uniform, but it will be noted that the lift, or opening of the valve is accomplished by the opening cam acting on the rider and that the high surface of the closing cam at this moment acts simply as a fulcrum for the rider in the opening movement and as the opening cam is directly connected through the driving mechanism the power necessary to open the valve is directly and entirely sustained by the direct driving mechanism without in any way influencing, or disturbing the governing mechanism. It will be noted also that the closing movement of the valve, which is the movement controlled by the closing cam, is accomplished as the roller passes down the incline of the cam and consequently the cam action tends to assist in a forward movement, rather than retarding, or loading the governor mechanism. On the other hand, when the rider passes over the low surface of the closing cam to the high surface this is accomplished without any action on the valve and consequently requires no power through the governor. For this reason a very small governor but very sensitive governor may be used for actuating the controlling mechanism.

Figure 14:
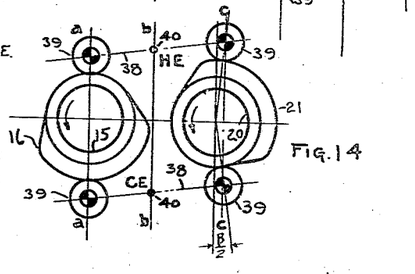
Fig. 14 shows a cam construction with the parts varied to control the valve movement to compensate for the difference in operation in the ends of the cylinder due to connecting rod angularity.
Figure 14A:
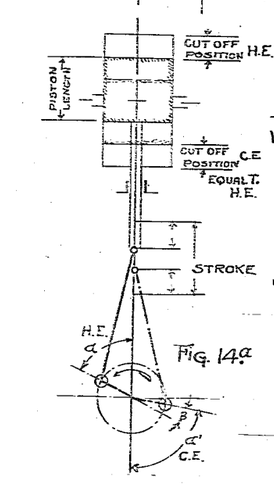
Fig. 14a shows a diagram illustrating variations from connecting rod angularity.
Figure 15:
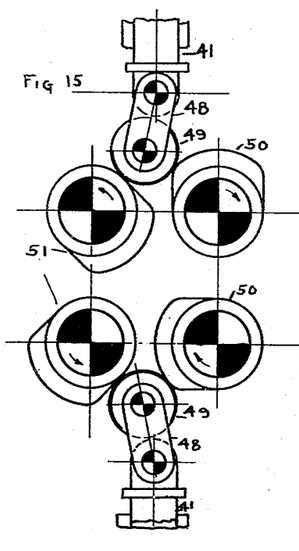
Figs. 15 to 20 inclusive show an alternative construction of cam actuating mechanism in various positions.
Figure 16:
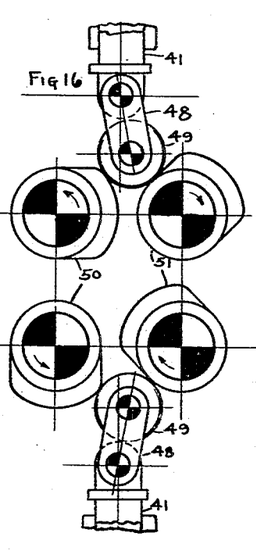
Figure 17:
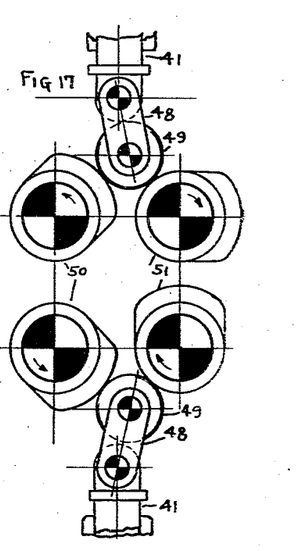

I prefer to arrange the rider as shown in Fig. 14. In this the arm of the rider between the pivot 40 and the roller on the opening cam is slightly shorter than the arm of the rider leading from the pivot pin 40 to the roller on the closing cam. As shown in Fig. 14 the distance $a$—$b$ is slightly less than the distance $b$—$c$. The result of this is to vary slightly the timing of the two ends of the cylinder to compensate for the variation brought about by the angularity of the connecting rod. Thus the closing of the upper end of the cylinder is slightly advanced by reason of the outward placing of the roller on the closing cam and the consequent passing of the high surface under the roller at a slightly advanced position whereas on the lower rider this outward facing of the roller by reason of the added distance $b$—$c$ retards the closing of the valve slightly. Thus without any added complication, or material variation in mechanism the operation of the valve on the two ends of the cylinder may be varied to compensate for the angularity of the connecting rod. The effect of this variation due to angularity of the connecting rod is diagramed in Fig. 14a, the solid line showing the connecting rod and crank at the point of cut-off at the high end of the cylinder, the broken line showing the position of the crank and connecting rod at the point of cut-off at the crank end of the cylinder. The angle a represents the travel from the center to the point of cut-off with the connecting rod for the high end of the cylinder and a' for the crank end of the cylinder. It will be noted that there is a greater travel at the crank end of the cylinder from the center to the point of cut-off represented by the angle b. This variation may be divided, as shown in Fig. 14 in which instance the angle c is one-half of the angle b.

It will be noted also that but a single set of cams are required to throw both valves and that these cams may be placed directly between the steam valves, thus making the mechanism very compact and with the moving parts directly in alinement so as to be more readily fabricated.

With the cams fixed on the shafts, the shafts themselves may be utilized in controlling the rotative relation of the cams and consequently the timing action of the valves in response to the cams. This is particularly desirable in connection with a speed sensitive device as it permits the speed sensitive device to be placed at the end of the shaft and thus conveniently coupled in for control. Further where the shafts are used for controlling the cams a plurality of cylinders may be used, practically without added mechanism over what is required for a single cylinder because regulation for all the cams may be carried to the cams by the shafts themselves.

By forming the cams such that the valve is lifted only through the combined action of the high surfaces of the cams and is retained at zero with one end of the rider on the high surface and the other on the low surface it is possible to utilize cams of a constant contour because the adjustment of the cam controlling the closing movement may be shifted to vary the timing of the valve without the lifting end of the closing cam producing a lifting movement of the valve and consequently the timing of the action of the lifting end of the closing cam is of no consequence except at neutral or at very short cut-off. Without this arrangement it would be necessary to vary the cam contours resulting in complications both as to the rider supporting surfaces and as to manner of control.

It is also desirable to give to the valve control as wide a variation in regulation as is possible. That is to say a regulation permitting of a very small lift and a very small time of opening of the valve and also an opening of the valve giving a full cut-off. With cams of constant contour it is possible to give approximately a full cut-off in that it is possible to make each cam 180°. Thus in the drawings, the high end of each slope is directly opposite the low end of the opposite slope on the cam. This is indicated by a diametrical line at the right of Figs. 5, 6 and 7. It will be noted also that when the closing cam is retarded very slightly from neutral position, as shown in Fig. 5, that the valve lift will be less than the maximum valve lift because the rider will be passing down the closing cam to a less extent than the movement of the rider up the slope of the opening cam. The valve lift, therefore, may be zero, or neutral varying from this gradually both in time of closing and lift up to a full lift of the valve and from there on affording a full lift with each adjustment, but a variation in the time of closing. Thus it is possible to give a very sensitive, yet very simple, control.

By making the cams 180° from the high end of a slope to the low end of the opposite slope the zero position is maintained at both ends of the cams, and this is an added advantage to the full cut-off possibilities.

Figure 18:
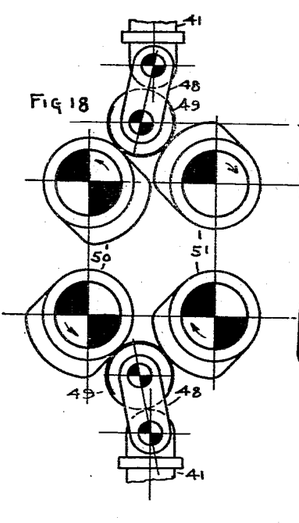
Figure 19:
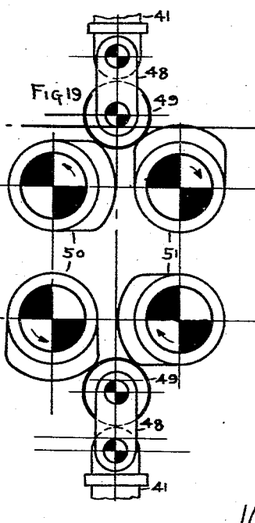
Figure 20:
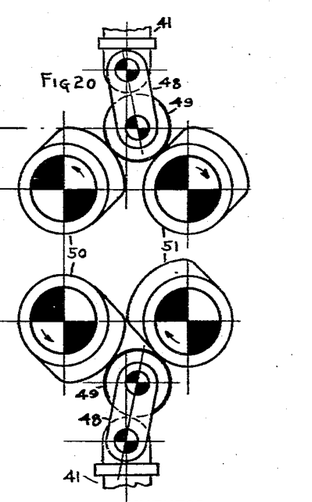

In Figs. 15 to 20 I have shown an alternative construction in which the push rod 41 is connected by means of a link 48 with a single roller 49, this roller operating as a rider on cams 50 and 51. This imposes a limitation upon the cam structure requiring a separate set of cams for each valve mechanism, the reason for this being that the contact with the single roller 49 cannot be spaced so as to have two rollers at opposite sides of the cam and 180° apart as in the preferred construction. Figs. 5, 6 and 7 show the different positions of the roller and of the cams with the cam 50 so positioned as to neutralize the action of the cams and there is no valve opening with this position of cams, the three positions showing the three positions of the cranks. Figs. 18 and 19 show the cam 50 thrown to a position opening the valve, the center positions being shown in Fig. 18, the open positions being shown in Fig. 19 and the closing position being shown in Fig. 20.

Iu Figs. 21 to 25 I show a further alternative construction in which the push rod 41 is connected by links 48 with a single roller 49 as in the structures shown in Figs. 15 to 20 but in this construction the cams 52 and 53 each have two high spots 54 and two low spots 55. With this shape of cam it is possible to use a single set of cams for operating both valves in that the points of contact of the rollers at the opposite sides are 90° and the double cams make a proper sequence with the contacts on the rollers at both sides. In this case, it will be understood that the cams are driven at half speed.

Figure 21:
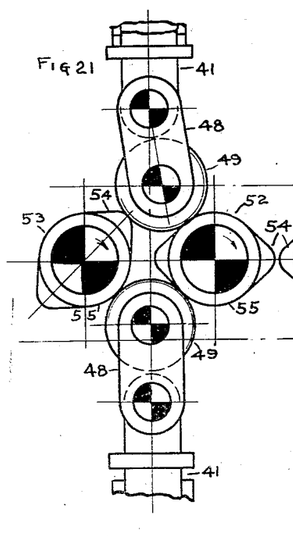
Figs. 21 to 26 another alternative construction with the cams in various positions.
Figures 22, 23:
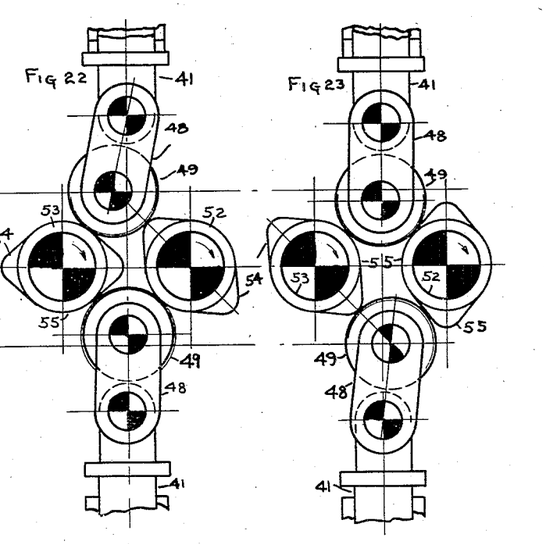

In Figs. 21, 22 and 23, the closing cam is set to neutralize the action on the roller and there is no lifting of the valve.

Figures 24, 25:
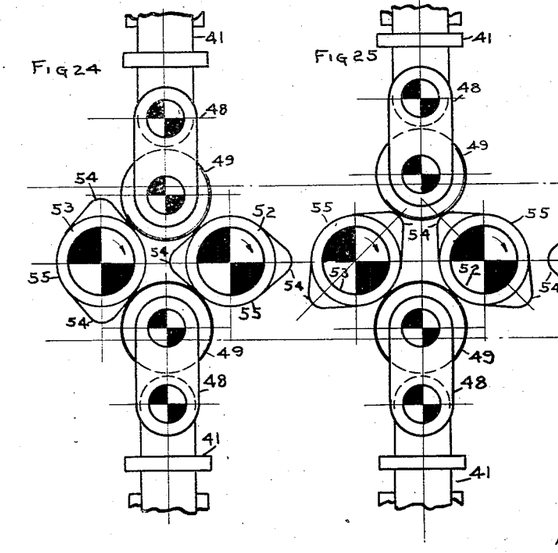
Figure 26:
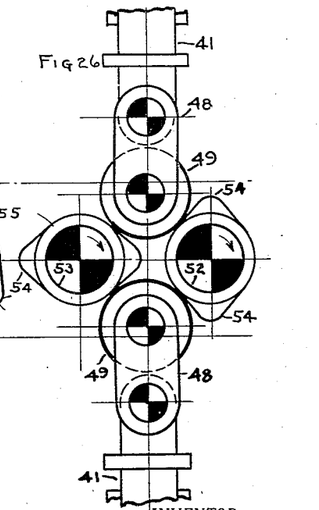

In Figs. 24, 25 and 26 the closing cam is swung to affect an opening of the valve, the position of the parts showing the valve closed in Fig. 24, full opening in Fig. 25 and closed in Fig. 26.

What I claim as new is:—

1. In a steam engine inlet valve gear, the combination of a double-acting engine cylinder; an engine valve for each end of the cylinder; two cams; riders for said cams, one for each valve; and connections between the riders and the valves, the cams and riders comprising means varying the action of the cams on the riders to vary the action of the valve to compensate for connecting rod angularity.

2. In a steam engine inlet valve gear, the combination of a double acting engine cylinder; an engine valve for each end of the cylinder; two cams; riders for said cams, one for each valve, said riders being in the form of rockers having one arm longer than the other; and connections between the arms of the rockers and the valves.

3. In a steam engine inlet valve gear, the combination of an inlet steam engine valve of the lift type; two cam shafts; a cam on each shaft, each cam maintaining a constant contour and having a high and low cam surface, one cam acting as the opening cam and the other as the closing cam; mechanism driven by the engine driving the cams, a rider in the form of a rocker having constant engagement on said cams and having movement continuously responsive to and a resultant of their combined action, both the high surfaces and both the low surfaces acting simultaneously on the rider in different points of the action of the cams on the rider, the rider passing from a low to a high surface on the opening cam while the rider is on a high surface on the closing cam to open the valve and the rider passing from a high surface on the closing cam to close the valve; a connection between the rider and the valve; and means adjusting the cams rotatively relatively to each other including a neutralizing adjustment making the passage of the rider from a low to a high surface on one cam coincident with and corresponding to the passage of the rider from high to low on the other of said cams.

4. In a steam engine inlet valve gear, the combination of an inlet steam engine valve of the lift type; two cam shafts; a cam on each shaft, each cam maintaining a constant contour and having a high and low cam surface, one cam acting as the opening cam and the other as the closing cam; mechanism driven by the engine driving the cams, a rider in the form of a rocker having constant engagement on said cams and having movement continuously responsive to and a resultant of their combined action, both the high surfaces and both the low surfaces acting simultaneously on the rider in different points of the action of the cams on the rider, the rider passing from a low to a high surface on the opening cam while the rider is on a high surface on the closing cam to open the valve and the rider passing from a high surface on the closing cam to close the valve; a connection between the rider and the valve, the connection controlling the maximum lift of the valve to correspond with the maximum lift of the cams; and means adjusting the cams rotatively relatively to each other including an adjustment making the passage of the rider from a low to a high surface on one cam coincident with and corresponding to the passage of the rider from high to low on the other of said cams.

5. In a steam engine inlet valve gear, the combination of an inlet steam engine valve of the lift type; two cam shafts; a cam on each shaft, each cam maintaining a constant contour and having a high and low cam surface, one cam acting as the opening cam and the other as the closing cam; mechanism driven by the engine driving the cams; a rider in the form of a rocker having constant engagement on said cams and having movement continuously responsive to and a resultant of their combined action, both the high surfaces and both the low surfaces acting on the rider in different points of the action and adjustment of the cams on the rider, the rider passing from a low to a high surface on the opening cam while the rider is on a high surface on the closing cam to open the valve and the rider passing from a high surface on the closing cam to close the valve; a connection between the rider and the valve; and means adjusting the cams rotatively relatively to each other including an adjustment making the passage of the rider from a low to a high surface on one cam coincident with and corresponding to the passage of the rider from high to low on the other of said cams; the high end of each slope of the cam being 180° from the low end of the opposite slope.

6. In a steam engine inlet valve gear, the combination of an inlet steam engine valve of the lift type; two cam shafts; a cam on each shaft, each cam maintaining a constant contour and having a high and low cam surface with a circular riding surface for a major portion of the high portion of the cam, one cam acting as the opening cam and the other as the closing cam; mechanism driven by the engine driving the cams, a rider in the form of a rocker having constant engagement on said cams and having movement continuously responsive to and a resultant of their combined action, both the high surfaces and both the low surfaces acting simultaneously on the rider in different points of the action of the cams on the rider, the rider passing from a low to a high surface on the opening cam while the rider is on a high surface on the closing cam to open the valve and the rider passing from a high surface on the closing cam to close the valve; and a connection between the rider and the valve, the connection controlling the maximum lift of the valve to correspond with the maximum lift of the cams.

7. In a steam engine inlet valve gear, the combination of an inlet steam engine valve of the lift type; two cam shafts; a cam on each shaft, each cam maintaining a constant contour and having a high and low cam surface with a circular riding surface on the high through a major portion of the valve opening range of the cam, one cam acting as the opening cam and the other as the closing cam; mechanism driven by the engine driving the cams, a rider in the form of a rocker having constant engagement on said cams and having movement continuously responsive to and a resultant of their combined action, both the high surfaces and both the low surfaces acting simultaneously on the rider in different points of the action of the cams on the rider, the rider passing from a low to a high surface on the opening cam while the rider is on a high surface on the closing cam to open the valve and the rider passing from a high surface on the closing cam to close the valve; and a connection between the rider and the valve, the connection controlling the maximum lift of the valve to correspond with the maximum lift of the cams.

8. In a steam engine inlet valve gear, the combination of an inlet steam engine valve of the lift type; two cam shafts; a cam on each shaft, each cam maintaining a constant contour and having a high and low cam surface, one cam acting as the opening cam and the other as the closing cam; mechanism driven by the engine driving the cams, a rider in the form of a rocker having constant engagement on said cams and having movement continuously responsive to and a resultant of their combined action, both the high surfaces and both the low surfaces acting simultaneously on the rider in different points of the action of the cams on the rider, the rider passing from a low to a high surface on the opening cam while the rider is on a high surface on the closing cam to open the valve and the rider passing from a high surface on the closing cam to close the valve; and a connection between the rider and the valve, the connection controlling the maximum lift of the valve to correspond with the maximum lift of the cams and the cams maintaining a constant lead through a range of cut off extending over a major portion of a stroke.

9. In a steam engine inlet valve gear, the combination of an inlet steam engine valve of the lift type; two cam shafts; a cam on each shaft, each cam maintaining a constant contour and having a high and low cam surface, one cam acting as the opening cam and the other as the closing cam; mechanism driven by the engine driving the cams; a rider in the form of a rocker having constant engagement on said cams and having movement continuously responsive to and a resultant of their combined action, both the high surfaces and both the low surfaces acting simultaneously on the rider in different points of the action of the cams on the rider, the rider passing from a low to a high surface on the opening cam while the rider is on a high surface on the closing cam to open the valve and the rider passing from a high surface on the closing cam to close the valve; a connection between the rider and the valve; means adjusting the cams rotatively relatively to each other including a neutralizing adjustment making the passage of the rider from a low to a high surface on one cam coincident with and corresponding to the passage of the rider from high to low on the other of said cams; and a speed sensitive device responsive to the speed of the engine controlling said means.

10. In a steam engine inlet valve gear, the combination of an inlet steam engine valve; two cam shafts; cams fixed on said shafts; a driving shaft; a gear on the driving shaft; a gear on one of the cam shafts meshing with the gear on the driving shaft driving said cam shaft; a spiral gear on the driving shaft; a spiral gear on the other of said cam shafts meshing with the spiral gear on the driving shaft; and means for moving one of the spiral gears to change the timing of the cam shaft driven thereby.

11. In a steam engine inlet valve gear, the combination of an inlet steam engine valve of the lift type; two cams, each cam maintaining a constant contour and having a high and low cam surface, one cam acting as the opening cam and the other as the closing cam; mechanism driven by the engine driving the cams; a rider in the form of a rocker having constant engagement on said cams and having movement continuously responsive to and a resultant of their combined action, both the high surfaces and both the low surfaces acting on the rider in different points of the action and adjustment of the cams on the rider, the rider passing from a low to a high surface on the opening cam while the rider is on a high surface on the closing cam to open the valve and the rider passing from a high surface on the closing cam to close the valve; a connection between the rider and the valve; and means adjusting the cams rotatively relatively to each other including an adjustment making the passage of the rider from a low to a high surface on one cam coincident with and corresponding to the passage of the rider from high to low on the other of said cams, the high end of each slope of the cam being 180° from the low end of the opposite slope.

12. In a steam engine inlet valve gear, the combination of an inlet steam engine valve of the lift type; two cam shafts; a cam on each shaft, each cam maintaining a constant contour and having a high and low cam surface, one cam acting as the opening cam and the other as the closing cam; mechanism driven by the engine driving the cams; a rider in the form of a rocker having constant engagement on said cams and having movement continuously responsive to and a resultant of their combined action, both the high surfaces and both the low surfaces acting on the rider in different points of the action and adjustment of the cams on the rider, the rider passing from a low to a high surface on the opening cam while the rider is on a high surface on the closing cam to open the valve and the rider passing from a high surface on the closing cam to close the valve; a connection between the rider and the valve; and means adjusting the cams rotatively relatively to each other including an adjustment making the passage of the rider from a low to a high and a high to a low surface on one cam coincident with and corresponding to the passage of the rider from high to low and low to high on the other of said cams.

13. In a steam engine inlet valve gear, the combination of a plurality of engine cylinders; opposed engine valves for each cylinder; two cam shafts extending across said cylinders; a pair of cams fixed on said shafts, each cam maintaining a constant contour and having a high and low cam surface, one cam acting as the opening cam and the other as the closing cam; mechanism driven by the engine driving the cams; riders in the form of rockers having constant engagement with and operating on opposite sides of each pair of cams and having movement continuously responsive to and a resultant of their combined action, both the high surfaces and both the low surfaces acting on the riders in different points of the action and adjustment of the cams on the riders, the riders passing from a low to a high surface on the opening cam while the riders are on a high surface on the closing cam to open the valves and the riders passing from a high surface on the closing cam to close the valves; connections between the riders and the valves; and means adjusting the cams rotatively relatively to each other including an adjustment making the passage of the riders from a low to a high surface and from a high to a low surface on one cam coincident with and corresponding to the passage of the riders from a high to a low and from a low to a high on the other of said cams.

14. In a steam engine inlet valve gear, the combination of an inlet steam engine valve of the lift type; two cam shafts; a cam on each shaft, each cam maintaining a constant contour and having a high and low cam surface, one cam acting as the opening cam and the other as the closing cam; mechanism driven by the engine driving the cams, a rider in the form of a rocker having constant engagement on said cams and having movement continuously responsive to and a resultant of their combined action, both the high surfaces and both the low surfaces acting simultaneously on the rider in different points of the action of the cams on the rider, the rider passing from a low to a high surface on the opening cam while the rider is on a high surface on the closing cam to open the valve and the rider passing from a high surface on the closing cam to close the valve; and a connection between the rider and the valve, the connection controlling the maximum lift of the valve to correspond with the maximum lift of the cams.

HERMAN G. MUELLER.